(12) United States Patent
Kwon et al.

(10) Patent No.: US 9,094,940 B2
(45) Date of Patent: Jul. 28, 2015

(54) SYSTEM AND METHOD FOR INDICATING PACKET TRANSMISSION TIME (71) Applicant: FutureWei Technologies, Inc., Plano, TX (US)

(72) Inventors: Young Hoon Kwon, San Diego, CA (US); Yunsong Yang, San Diego, CA (US); Zhigang Rong, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 191 days.

(21) Appl. No.: 13/914,406

(22) Filed: Jun. 10, 2013

(65) Prior Publication Data

US 2013/0336184 A1 Dec. 19, 2013

Related U.S. Application Data (60) Provisional application No. 61/659,755, filed on Jun. 14, 2012.

(51) Int. Cl.
H04W 72/00 (2009.01)
H04W 74/00 (2009.01)
H04W 74/04 (2009.01)

(52) U.S. Cl.
CPC .......... *H04W 72/005* (2013.01); *H04W 74/002* (2013.01); *H04W 74/04* (2013.01)

(58) Field of Classification Search
CPC .. H04W 74/002; H04W 74/005; H04W 74/04
USPC ....................................... 370/311
See application file for complete search history.

(56) References Cited

U.S. PATENT DOCUMENTS

| 8,467,345 | B2 | 6/2013 | Abraham et al. | |
|---|---|---|---|---|
| 2013/0003689 | A1 | 1/2013 | Kwon et al. | |
| 2013/0329658 | A1* | 12/2013 | Liu | 370/329 |
| 2013/0336245 | A1* | 12/2013 | Fischer | 370/329 |
| 2014/0003414 | A1* | 1/2014 | Choudhury et al. | 370/347 |
| 2014/0071900 | A1* | 3/2014 | Park | 370/329 |
| 2014/0171056 | A1* | 6/2014 | Jafarian et al. | 455/418 |

(Continued)

FOREIGN PATENT DOCUMENTS

| CN | 101615999 A | 12/2009 |
|---|---|---|
| CN | 102124662 A | 7/2011 |

(Continued)

OTHER PUBLICATIONS

IEEE 802.11-12/0843r0, 'Restricted Access Window Signaling for Uplink Channel Access', Jul. 2012, pp. 1-13.*

(Continued)

*Primary Examiner* — Melvin Marcelo
(74) *Attorney, Agent, or Firm* — Slater & Matsil, L.L.P.

(57) ABSTRACT

A method for exchanging data includes generating a usage indicator for an access window, the usage indicator including a first indication of if an allowed station in a list of allowed stations needs to receive information about its resource allocation and at least one of a second indication of a start time of the access window, and a third indication of the list of allowed stations, and broadcasting the usage indicator. The method also includes exchanging data with at least one of the allowed stations within the access window in accordance with the usage indicator.

33 Claims, 8 Drawing Sheets

(56) References Cited

U.S. PATENT DOCUMENTS

2014/0269628 A1* 9/2014 Ghosh et al. ............. 370/336
2014/0328264 A1* 11/2014 Merlin et al. ............. 370/329

FOREIGN PATENT DOCUMENTS

WO  2011102632 A2  8/2011
WO  2011112056 A2  9/2011

OTHER PUBLICATIONS

IEEE 802.11-12/650r0, 'Grouping Methodology', May 2012, pp. 1-14.*

IEEE 802.11-12/0329r1, 'Group Synchronized DCF', Mar. 2012, pp. 1-13.*

IEEE 802.11-13/0285r0, 'Resource Allocation Frame Format for RAW-based Medium Access', Mar. 2013, pp. 1-12.*

"IEEE Standard for Information technology—Telecommunications and information exchange between systems Local and metropolitan area networks—Specific Requirement Part 11: Wireless LAN Medium Access Control (MAC) and Physical Layer (PHY) Specifications," IEEE Std 802.11™-2012 (Revision of IEEE Std 802.11-2007), IEEE Computer Society, Sponsored by LAN/MAN Standards Committee, Mar. 29, 2012, 2,793 pages.

Chu, L., et al., Scheduled Medium Access for Large Low Power BSS, IEEE 802.11-12/0624r2, May 12, 2012, 5 pages.

Park, M., et al., "Uplink Channel Access," IEEE 802.11-12/0606r1, May 14, 2012, 21 pages.

Seok, Y., "Uplink Channel Access General Procedure," IEEE 802.11-12/0831r0, Jul. 12, 2012, 19 pages.

International Search Report and Written Opinion of Patent Cooperation Treaty (PCT), International Application No. PCT/CN2013/077141, Applicant Huawei Technologies Co., Ltd., date of mailing Sep. 26, 2013, 10 pages.

Hoang, A. et al., "Prioritized PS-Polls," IEEE 802.11-12/0665r1, May 2012, 12 pages.

Extended European Search Report received in Application No. 13804712.1-1857 mailed Apr. 15, 2015, 9 pages.

Park, "Proposed Specification Framework for TGah," IEEE 802.11 Wireless LANs, TGac Spec Framework, May 2012, 20 pages.

* cited by examiner

SYSTEM AND METHOD FOR INDICATING PACKET TRANSMISSION TIME

This application claims the benefit of U.S. Provisional Application No. 61/659,755, filed on Jun. 14, 2012, entitled "System and Method for Packet Transmission Time Indication," which application is hereby incorporated herein by reference.

TECHNICAL FIELD

The present disclosure relates generally to digital communications, and more particularly to a system and method for indicating packet transmission time.

BACKGROUND

Currently, Task Group ah (TGah) of the IEEE 802.11 technical standards is operating on defining the local area network protocol, to be referred to as 802.11ah, with specific focus on sub 1 GHz carrier frequencies. Main requirements of TGah include larger coverage area of up to 1 kilometer (km), a physical (PHY) layer data rate of at least 100 kilo-bits-per-second (kbps), a maximum aggregate multi-station data rate of 20 mega-bits-per-second (Mbps), the use of orthogonal frequency division multiplexing (OFDM) PHY modulation, and support for more than 2007 associations. However, overhead is a critical issue for 802.11ah. The PHY of 802.11ah uses a 10 times slower clock than the normal 802.11 protocol. Hence, each symbol is 10 times longer than in the normal 802.11 protocol. Efficiency of the protocol is thus important for 802.11ah.

SUMMARY OF THE DISCLOSURE

Example embodiments of the present disclosure which provide a system and method for indicating packet transmission time.

In accordance with an example embodiment of the present disclosure, a method for exchanging data is provided. The method includes generating, by an access point, a usage indicator for an access window, the usage indicator including a first indication of if an allowed station in a list of allowed stations needs to receive information about its resource allocation and at least one of a second indication of a start time of the access window, and a third indication of the list of allowed stations, and broadcasting, by the access point, the usage indicator. The method also includes exchanging, by the access point, data with at least one of the allowed stations within the access window in accordance with the usage indicator.

In accordance with another example embodiment of the present disclosure, a method for exchanging data is provided. The method includes receiving, by a station, a usage indicator for an access window, the usage indicator including a first indication of if allowed stations need to receive information about their resource allocation and at least one of a second indication of a starting time of the access window, and a third indication of a list of allowed stations, and determining, by the station, if the station is in the list of allowed stations. The method also includes exchanging, by the station, data with an access point within the access window in accordance with the usage indicator if the station is in the list of allowed stations.

In accordance with another example embodiment of the present disclosure, an access point is provided. The access point includes a processor, and a transmitter operatively coupled to the processor. The processor generates a usage indicator for an access window, the usage indicator including a first indication of if an allowed station in a list of allowed stations needs to receive information about its resource allocation and at least one of a second indication of a start time of the access window, and a third indication of the list of allowed stations, and exchanges data with at least one of the allowed stations within the access window in accordance with the usage indicator. The transmitter broadcasts the usage indicator.

In accordance with another example embodiment of the present disclosure, a station is provided. The station includes a receiver, and a processor operatively coupled to the receiver. The receiver receives a usage indicator for an access window, the usage indicator including a first indication of if an allowed station needs to receive information about its resource allocation and at least one of a second indication of a starting time of the access window, and a third indication of a list of allowed stations. The processor determines if the station is in the list of allowed stations, and exchanges data with an access point within the access window in accordance with the usage indicator if the station is in the list of allowed stations.

In accordance with another example embodiment of the present disclosure, a method for operating an access point of an IEEE 802.11 compliant communications system is provided. The method includes specifying, by the access point, a restricted access window for a RAW Group of stations served by the access point, and generating, by the access point, a first indicator of if a station in the RAW Group of stations needs to receive information about its resource allocation. The method also includes broadcasting, by the access point, information about the restricted access window and the first indicator in one of a beacon frame and a short beacon frame.

One advantage of an embodiment is that the use of different packet transmission time indication techniques allows for the adaptation of restricted access windows to changing data exchange needs. Therefore, a low signaling overhead packet transmission time indication technique can be used when data exchange needs are consistent and regular, while a high signaling overhead packet transmission time indication technique can be used when data exchange needs are irregular and vary widely.

A further advantage of an embodiment is that the ability to adapt to changing data exchange needs allows for more efficient use of signaling overhead as well as available network resources.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to indicating packet transmission time. For example, an access point generates a usage indicator for an access window, the usage indicator including a first indication of if an allowed station in a list of allowed stations needs to receive information about its resource allocation and at least one of a second indication of a start time of the access window, and a third indication of the list of allowed stations, and broadcasts the usage indicator. The access point also exchanges data with at least one of the allowed stations within the access window in accordance with the usage indicator. As another example, a station receives a usage indicator for an access window, the usage indicator including a first indication of if allowed stations need to receive information about their resource allocation and at least one of a second indication of a starting time of the access window, and a third indication of a list of allowed stations, and determines if the station is in the list of allowed stations. The station also exchanges data with an access point within the access window in accordance with the usage indicator if the station is in the list of allowed stations.

The present disclosure will be described with respect to example embodiments in a specific context, namely an IEEE 802.11 TGah compliant communications system that uses restricted access windows and a variety of packet transmission time indication techniques. The disclosure may also be applied, however, to other standards compliant, such as The Third Generation Partnership Project (3GPP) or other 802.11 technical standards, and non-standards communications systems that uses restricted access windows and a variety of packet transmission time indication techniques.

Figure 1:
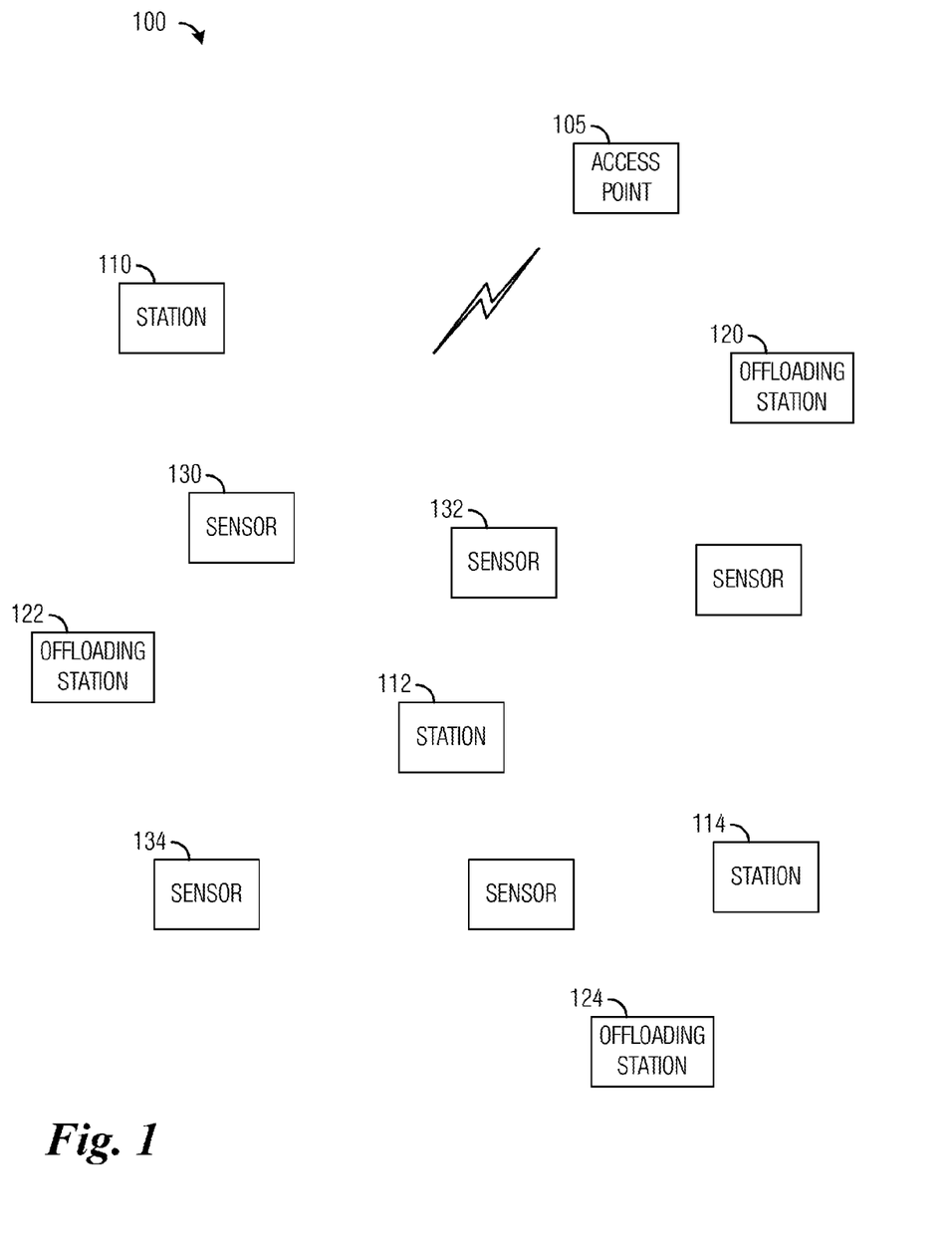
FIG. 1 illustrates an example communications system according to example embodiments described herein.

FIG. 1 illustrates a communications system 100. It is noted that communications system 100 may also be referred to as a wireless LAN (WLAN) basic service set (BSS). Communications system 100 includes an access point (AP) 105, an example of a communications controller, serving a plurality of stations (an example of communications devices). The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information.

While it is understood that communications systems may employ multiple access points capable of communicating with a number of stations, only a limited number of access points and stations are illustrated for simplicity.

In the normal 802.11 protocol, for downlink data transmissions, an access point (AP) sends a traffic indication map (TIM) comprising information of whether or not there is downlink data buffered for each of the stations (STAs) served by the access point. In a situation when there is buffered downlink data for a station, the station may, after decoding the TIM, send a power save poll (PS Poll) frame indicating to the access point that the station is awake and is ready to receive a downlink data packet. After the access point receives the PS Poll frame, it may directly transmit the downlink data packet to the station if it is ready or transmit an acknowledgement frame in response to the PS Poll frame if it is not ready. The access point shortly follows up with the transmission of the downlink data packet.

If multiple stations were indicated in the TIM as having buffered downlink data at the access point, the multiple stations may all attempt to transmit the PS Poll frames at substantially the same time, leading to increased probability of collision. Since the multiple stations within the coverage area of the access point may not be able to listen to what other stations transmit due to potentially large distances between stations, the current carrier sense multiple access with collision detection (CSMA-CD) mechanism may not work efficiently. The inability of the stations to listen to one another is commonly referred to as the hidden node problem. The hidden node problem becomes worse in the usage scenarios of 802.11ah, e.g., outdoor channel environments that have more severe shadowing and/or fading, larger coverage area, greater number of stations operating within the coverage area of the access point, and the like.

Typically, there are several techniques that an access point may employ to indicate packet transmission times to a station. A first technique, which may be referred to as implicit indication, may involve the access point not transmitting any specific information and/or indicator of a station's packet transmission time. Rather, the station may be able to infer its own packet transmission time according to a pre-specified rule. Therefore, the station does not need to receive specific information about its own packet transmission time. As an example, the station may be able to infer its own packet transmission according to its position in the TIM. A second technique, which may be referred to as explicit indication, may involve the access point transmitting specific information and/or indicator of a station's packet transmission time. Therefore, the station needs to receive specific information about its own packet transmission time. As an example, the access point may transmit control signaling specifying the starting time and/or frequency channel of the station's packet transmission time.

It is noted that the term packet transmission time may be indicative of a time of a packet transmission made by an access point, which is a downlink transmission, or a time of a packet transmission made by a station, which is an uplink transmission. Packet transmission time may therefore be the start of a data exchange between an access point and a station. It is also noted that the term packet transmission time may also be used indicate a packet transmission frequency or both a packet transmission time and a packet transmission frequency. Therefore, the use of the term packet transmission time should not be construed as being limiting to either the scope or the spirit of the example embodiments.

It is further noted that it may be possible for an access point or a station to not be able to transmit a packet at a given packet transmission time. As an example, the communications channel may be busy at the given packet transmission time, the access point or the station may not be ready to transmit, and the like. Therefore, a packet transmission time may be considered to be an earliest time that an access point or the station may transmit, but the access point or the station may actually transmit at a later time. Thus, a packet transmission time may be considered to be an estimated time. Additionally, a packet transmission time may specify a time prior to which an access point or station cannot transmit.

Figure 2:
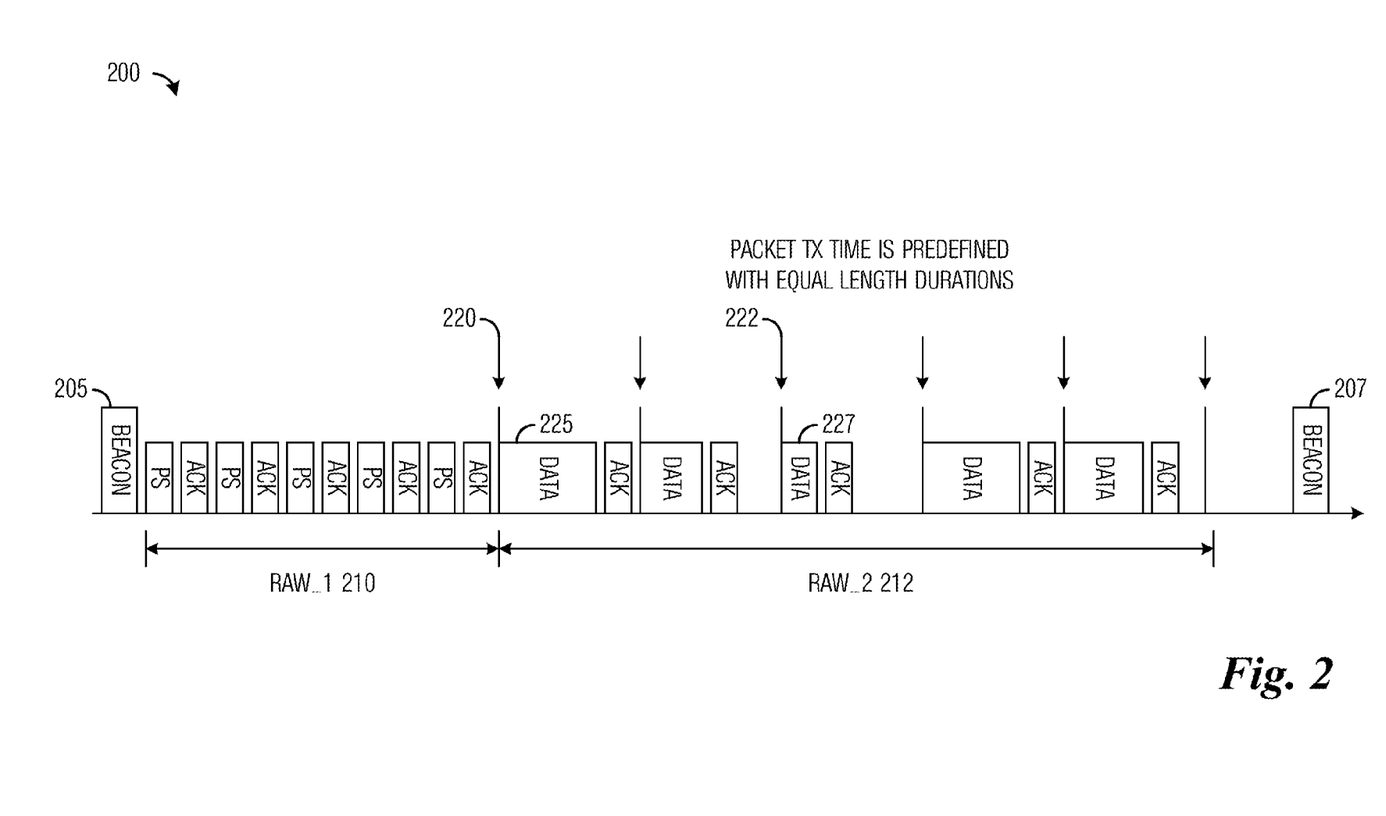
FIG. 2 illustrates an example diagram of transmissions made between an access point and a plurality of stations, wherein an implicit indication technique for indicating packet transmission times is used according to example embodiments described herein.

FIG. 2 illustrates a diagram 200 of transmissions made between an access point and a plurality of stations, wherein an implicit indication technique for indicating packet transmission times is used. As shown in FIG. 2, transmissions made by the access point and stations in the plurality of stations between a first beacon 205 and a second beacon 207 are shown. Between first beacon 205 and second beacon 207, two restricted access windows (RAWs) are defined. In general, a RAW may be defined or specified from resources of a communications channel within a time interval, such as a time interval between first beacon 205 and second beacon 207. The access point may specify which stations will be able to access the communications channel within the RAW. In other words, access to the communications channel during the RAW is restricted to those expressly allowed access by the access point. A first RAW 210 ("RAW_1") may be referred to as a polling period, and a second RAW 212 ("RAW_2") may be referred to as a data transmission period. It is noted that although two RAWs are shown, any number of RAWs may be defined within a given time interval, as long as they do not exceed the time interval itself. Therefore, the illustration and discussion of the two RAWs should not be construed as being limiting to the scope or the spirit of the example embodiments.

Generally, information regarding a RAW is provided to stations by an access point. The information may be transmitted in a beacon. The information may be transmitted periodically, regularly, or when the access point makes a change to a RAW. The information regarding the RAW may be referred to as a usage indicator. The usage indicator may include information such as a start time of the RAW, a duration of the RAW, stations allowed to access the communications channel during the RAW, a technique used to indicate packet transmission time, slot duration, and the like.

In first RAW 210 an implicit indication technique is used to indicate packet transmission times and each station of the plurality of stations that is permitted to transmit a polling packet (labeled as "PS") can estimate its packet transmission time in accordance to a pre-specified rule, such as based on its position in a TIM. In second RAW 212 an implicit indication technique is used to indicate packet transmission times and each station of the plurality of stations that is permitted to transmit a polling packet can estimate its packet transmission time within second RAW 212 in accordance to a pre-specified rule, such as based on its position in a TIM. Also shown in FIG. 2 are the packet transmission times for each station, such as packet transmission time 220, packet transmission time 222, and the like. It is noted that the packet transmission times are fixed so if a station assigned to a packet transmission time has sufficient data to substantially fill up the packet transmission time, such as for packet 225 transmitted in packet transmission time 220, the communications channel efficiency is high. However, if a station does not have sufficient data to fill up the packet transmission time, such as for packet 227 transmitted in packet transmission time 222, the communications channel efficiency is low.

Figure 3:
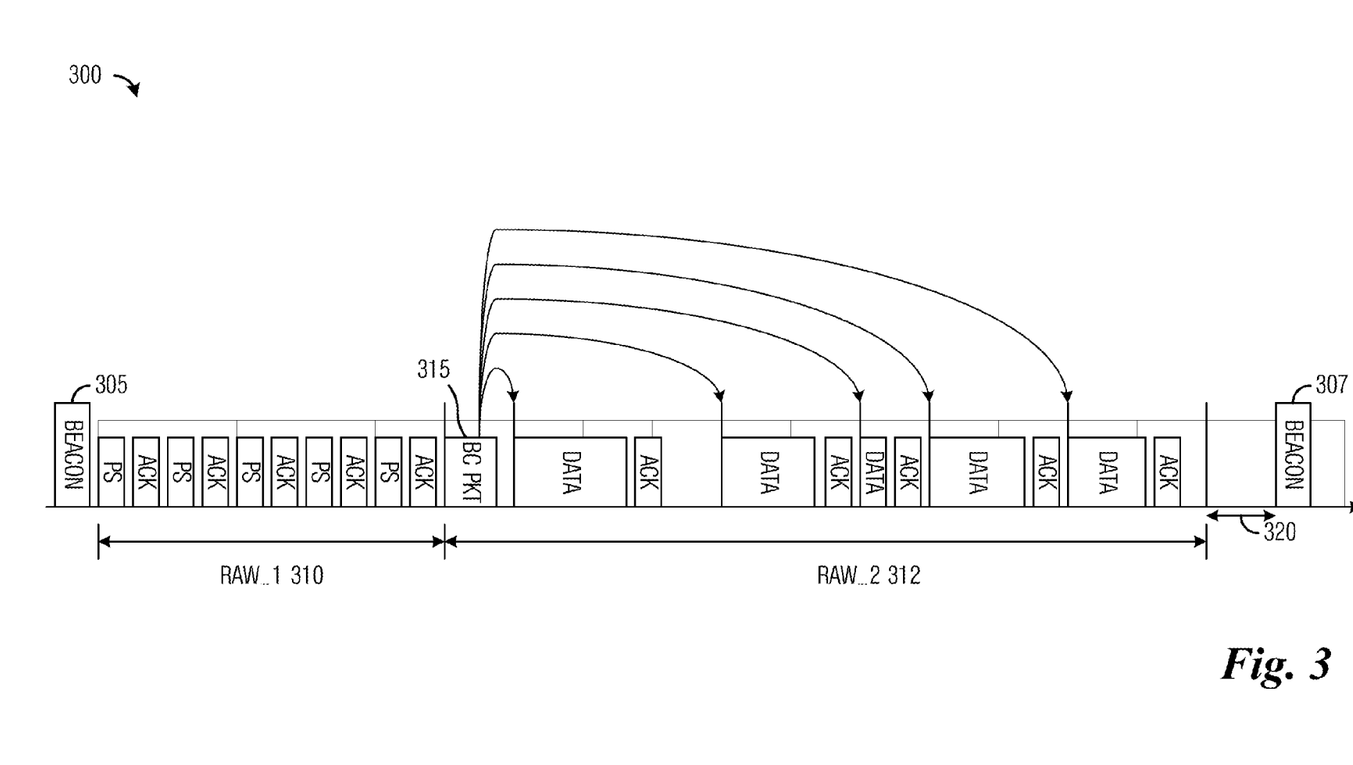
FIG. 3 illustrates an example diagram of transmissions made between an access point and a plurality of stations, wherein a first explicit indication technique for indicating packet transmission times is used according to example embodiments described herein.

FIG. 3 illustrates a diagram 300 of transmissions made between an access point and a plurality of stations, wherein a first explicit indication technique for indicating packet transmission times is used. As shown in FIG. 3, transmissions made by the access point and stations in the plurality of stations between a first beacon 305 and a second beacon 307 are shown. Between first beacon 305 and second beacon 307, two restricted access windows (RAWs) are defined. A first RAW 310 ("RAW_1") may be referred to as a polling period, and a second RAW 312 ("RAW_2") may be referred to as a data transmission period.

In first RAW 310 an implicit indication technique is used to indicate packet transmission times and each station of the plurality of stations that is permitted to transmit a polling packet (labeled as "PS") can estimate its packet transmission time in accordance to a pre-specified rule, such as based on its position in a TIM. In second RAW 312 an explicit indication technique is used to indicate packet transmission times and each station of the plurality of stations that is permitted to transmit receives an indicator of its packet transmission window. According to an example embodiment, the access point may transmit a broadcast packet 315 ("BC PKT") at the beginning of second RAW 312. Broadcast packet 315 may include packet transmission time information for each station permitted to transmit (as an example, there may be packet transmission time information for each station that transmitted a polling packet to the station). Broadcast packet 315 is shown in FIG. 3 as being broadcast at a start or a beginning of second RAW 312, however, broadcast packet 315 may be transmitted at other times as long as it is transmitted prior to any of the packet transmission times of second RAW 312. It is noted first RAW 310 and second RAW 312 are partitioned into slots of fixed duration, such as slot 320, and that the packet transmission times are assigned to begin at slot intervals. It is also noted that the slots for a single RAW are equal in duration, however, slots of different RAWs may differ.

Figure 4:
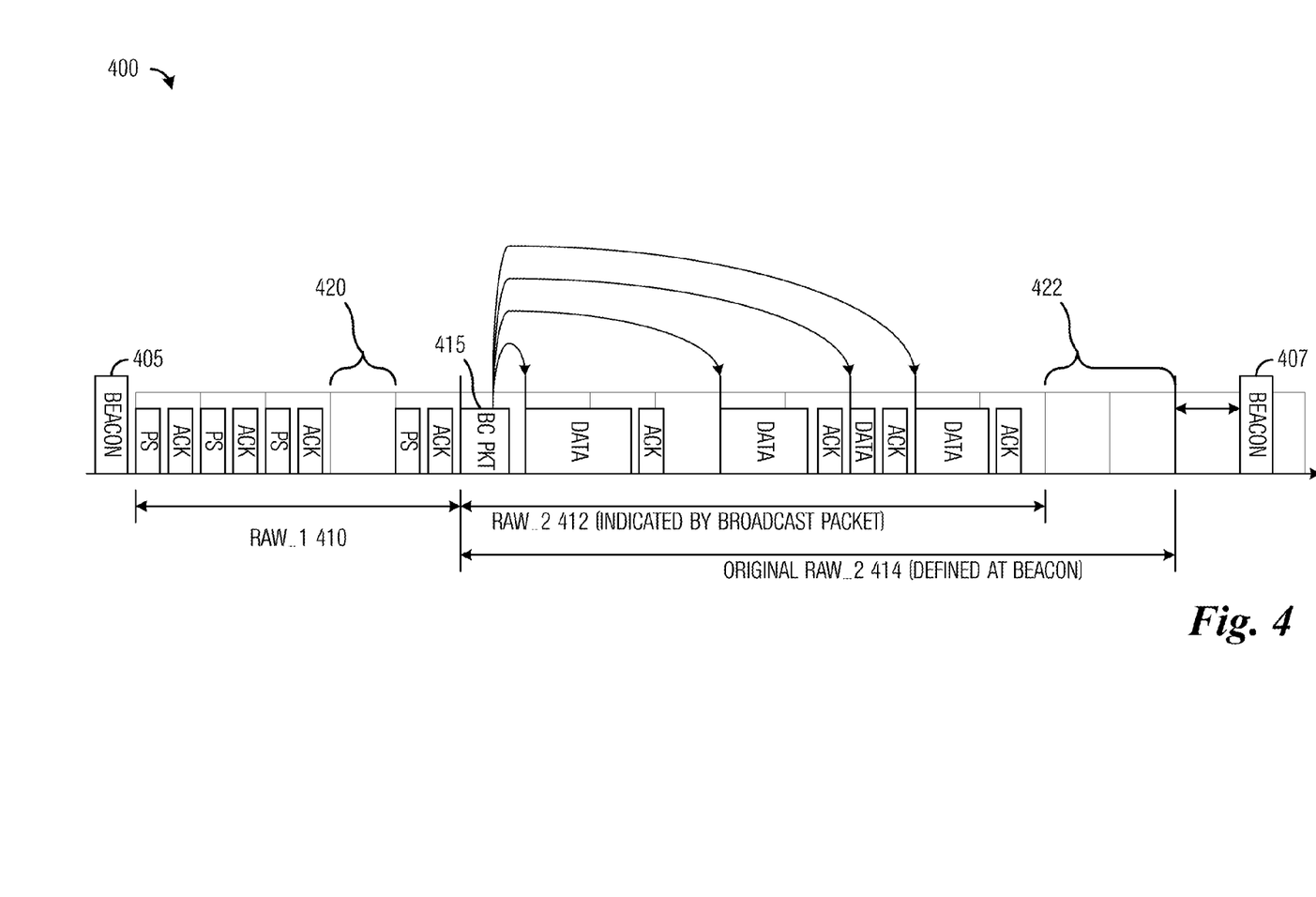
FIG. 4 illustrates an example diagram of transmissions made between an access point and a plurality of stations, wherein a second explicit indication technique for indicating packet transmission times is used according to example embodiments described herein.

FIG. 4 illustrates a diagram 400 of transmissions made between an access point and a plurality of stations, wherein a second explicit indication technique for indicating packet transmission times is used. As shown in FIG. 4, transmissions made by the access point and stations in the plurality of stations between a first beacon 405 and a second beacon 407 are shown. Between first beacon 405 and second beacon 407, two restricted access windows (RAWs) are defined. A first RAW 410 ("RAW_1") may be referred to as a polling period, and a second RAW 412 ("RAW_2") may be referred to as a data transmission period.

In first RAW 410 an implicit indication technique is used to indicate packet transmission times and each station of the plurality of stations that is permitted to transmit a polling packet (labeled as "PS") can estimate its packet transmission time in accordance to a pre-specified rule, such as based on its position in a TIM. In second RAW 412 an explicit indication technique is used to indicate packet transmission times and each station of the plurality of stations that is permitted to transmit receives an indicator of its packet transmission window. According to an example embodiment, the access point may transmit a broadcast packet 415 ("BC PKT") at the start or the beginning of second RAW 412. In addition to explicitly indicating the packet transmission times for stations, the station may alter the duration of second RAW 412. In general, the duration of the RAWs are pre-specified and may be provided to the stations in beacons. However, in practical use, some of the stations that the access point permits to transmit a polling packet may not actually transmit a polling packet. As an example, a station may have been asleep and missed its opportunity to transmit the polling packet. Therefore, second RAW 412 may not be needed in its entirety. Hence, the access point may alter (e.g., shorten) the duration of second RAW 412 and free up resources for other use, such as in a contention period.

The access point may include information regarding the alteration to second RAW 412 in broadcast packet 415. As shown in FIG. 4, second RAW 412 is as altered by information in broadcast packet 415, while an original second RAW 414 ("ORIGINAL RAW_2") shows the duration of second RAW 412 as specified by the access point in a beacon prior to be overridden by information in broadcast packet 415. It is noted first RAW 410 and second RAW 412 are partitioned into slots of fixed duration, and that the packet transmission times are assigned to begin at slot intervals. It is also noted that the slots for a single RAW are equal in duration, however, slots of different RAWs may differ.

Figure 5:
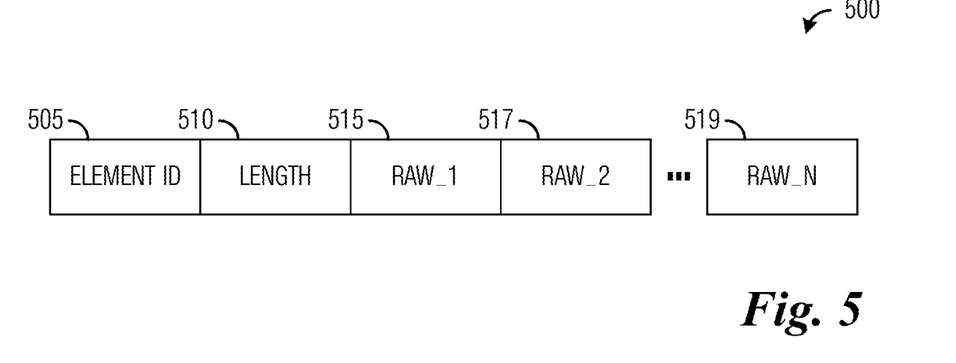
FIG. 5 illustrates an example information element according to example embodiments described herein.

FIG. 5 illustrates an information element (IE) 500. IE 500 may be included in a broadcast packet, such as beacon frame 205, beacon frame 305, and beacon frame 405, to allow an access point to provide information regarding RAWs to stations served by the access point. IE 500 may include an element identifier ("ELEMENT ID") field 505 that is used to carry an identifier (ID) to identify IE 500 as an IE for conveying RAW information. IE 500 may also include a length field 510 that is used to carry a length of IE 500. IE 500 may also include one or more RAW fields, such as RAW_1 field 515, RAW_2 field 517, and RAW_N field 519. The RAW fields carry information about an associated RAW.

As an illustrative example, a RAW field may include subfields, which may include indicators and/or values:
Group(s) Identifier—specifies users allowed to access the RAW or RAW Group;
RAW Start Time—specifies the starting time of communications channel access for the users allowed to access the RAW;
Packet Transmission Time Indication Type—specifies the technique used for packet transmission indication, e.g., either implicit or explicit;
RAW Duration Modification—specifies an altered RAW duration;
Packet Type—specifies the purpose of the RAW;
RAW Duration—specifies the duration of communications channel access for the users allowed to access the RAW; and
Slot Duration—specifies the duration of each slot within the RAW.

Generally, the implicit indication technique involves minimum signaling overhead. However, with the implicit indication technique, a station's packet transmission duration is normally fixed regardless of the station's actual packet transmission time requirements. The use of fixed packet transmission durations may lead to overall communications system inefficiency since the station may need only a fraction of its assigned transmission duration, therefore after the station performs its data exchange, the communications channel is idle for remainder of the transmission duration. Similarly, if the station needs more than its assigned transmission duration, the station may need to spread its data exchange over an extended period of time, thereby increasing communications latency.

However, not all packets exchanged in a data exchange are the same size. Some packets, such as polling packets, are substantially the same size independent of source and/or destination. Some packets, such as data packets, may differ greatly in size depending on each station's application. Therefore, for some packet types, the use of implicit indication of packet transmission time may be appropriate, while for some other packet types, the use of explicit indication of packet transmission time may be better when both communications channel efficiency and signaling overhead are considered.

Figure 6:
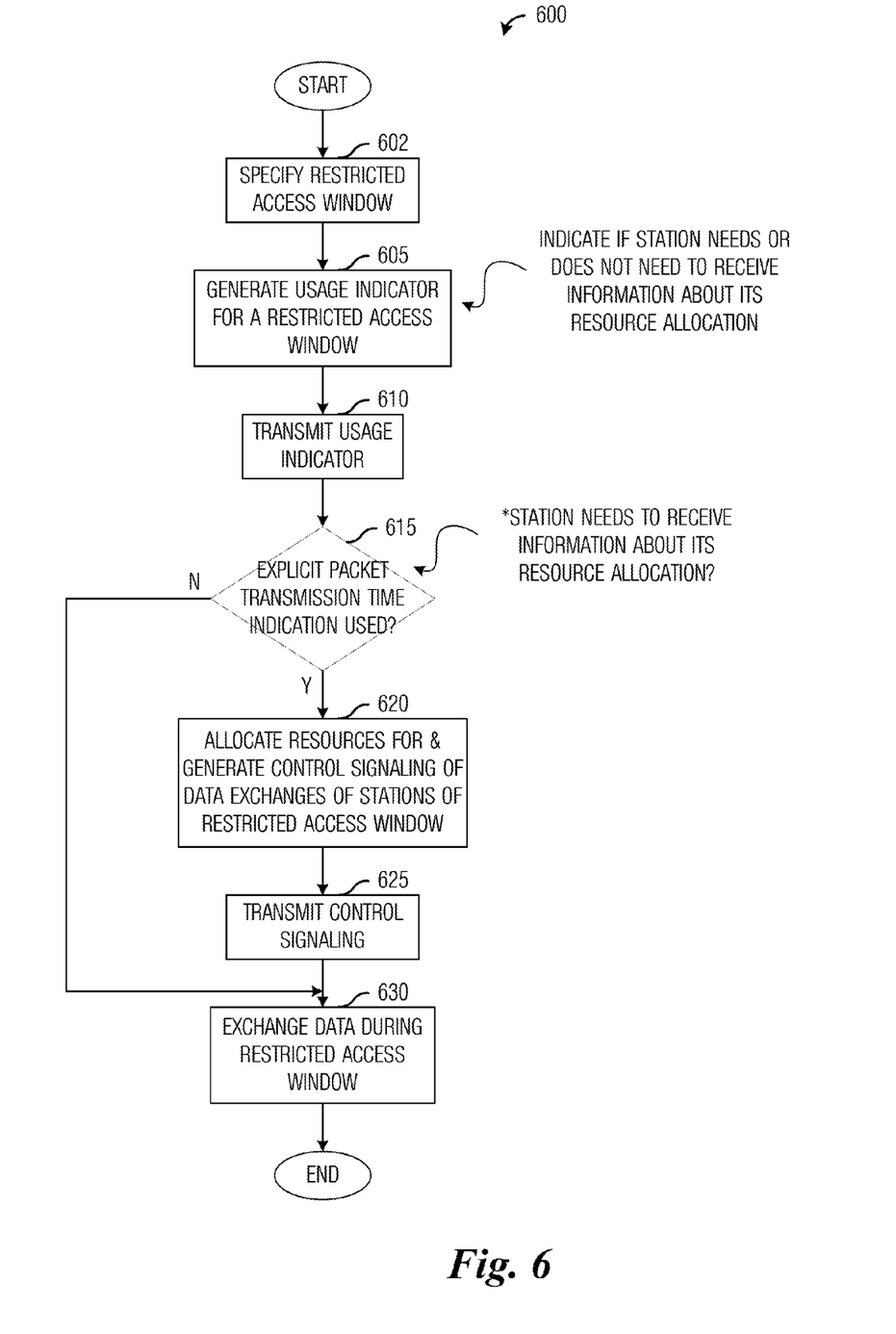
FIG. 6 illustrates an example flow diagram of operations occurring in an access point as the access point exchanges data with a plurality of stations according to example embodiments described herein.

FIG. 6 illustrates a flow diagram of operations 600 occurring in an access point as the access point exchanges data with a plurality of stations. Operations 600 may be indicative of operations occurring in an access point, such as access point 105, as the access point exchanges data with a plurality of stations.

Operations 600 may begin with the access point specifying a restricted access window (RAW) (block 602). As discussed previously, the RAW may be specified from resources of a communications channel. Access to the resources of the communications channel during the RAW may be limited to stations as specified by the access point. As an example, the access point may specify that only stations belonging to a specific group may access the resources of the communications channel. Alternatively, the access point may specify stations having a particular subscription level, priority level, a particular type, a particular traffic type, and the like may access the resources of the communications channel.

The access point may generate a usage indicator for the RAW (block 605). As discussed previously, the usage indicator may include indicators and/or information such as a start time of the RAW, a duration of the RAW, stations allowed to access the communications channel during the RAW, packet types to be transmitted during the RAW, a technique used to indicate packet transmission time, slot duration, and the like. In general, the usage indicator may include information about the RAW. As an illustrative example, the usage indicator may include an indicator of a technique used to indicate packet transmission time, as well as information about the RAW, such as a start time of the RAW, a duration of the RAW, stations allowed to access the communications channel during the RAW, packet types to be transmitted during the RAW, slot duration, and the like. As another illustrative example, an indicator of the technique used to indicate packet transmission time may be set to either explicit indicator if explicit packet transmission time indication is used or implicit indicator if implicit packet transmission time indication is used.

The indicator may also indicate if a station is to receive information about is packet transmission time. As an example, the indicator may indicate that implicit packet transmission time indication is used, which means that a station does not need to receive information about its packet transmission time. However, if the indicator indicates that explicit packet transmission time indication is used, then stations would have to receive information about their packet transmission times. Therefore, if the indicator indicates that implicit transmission time indication is used, it is also indicating that a station does not need to receive information about its packet transmission time. While if the indicator indicates that explicit transmission time indication is used, it is also indicating that a station does need to receive information about its packet transmission time. Similarly, if the indicator indicates that the station does not need to receive information about its packet transmission time, it is also indicating that implicit transmission time indication is used. While if the indicator indicates that the station does need to receive information about its packet transmission time, it is also indicating that explicit transmission time indication is used. The access point may transmit the usage indicator (block 610). The access point may insert the usage indicator in a beacon and broadcast the beacon, which may occur at specified intervals.

The access point may perform a check to determine if explicit transmission time indications are used to specify packet transmission times in the RAW, as indicated by the indicator of the technique used to indicate packet transmission times in the usage indicator (block 615). In other words, the access point may check to determine if the stations need to receive information about their resource allocations. If the access point uses explicit transmission time indications to specify packet transmission times for stations in the RAW, the access point may allocate resources for data exchanges and generate control signaling for the data exchanges (block 620). As discussed previously, the control signaling may include starting times for data exchanges for the stations and the access point, where the stations may be those that transmitted polling packets (e.g., PS-Polls) to the access point. The control signaling may also include an adjustment to the RAW, e.g., the duration of the RAW. The access point may transmit the control signaling (block 625). The access point may transmit the control signaling at the start or the beginning of the RAW. As an example, the control signaling may be transmitted in a broadcast packet, such as broadcast packet 315, at the beginning of the RAW. Alternatively, the access point may transmit the control signaling at any time before the beginning of the RAW. As an example, the access point may transmit the control signaling after transmitting the beacon. If the access point uses implicit transmission time indications to specify packet transmission times for stations in the RAW, as indicated by the indicator of the technique used to indicate packet transmission times in the usage indicator (block 615), the access point may not need to transmit any additional information regarding the RAW unless the RAW has been altered in some way.

The access point may exchange data with the stations during the RAW (block 630). As discussed previously, exchanging data may include the access point transmitting packets to the stations and/or the access point receiving packets from the stations. The data exchange occurring within the RAW follows the RAW as specified by the access point and in accordance with the usage indicator as transmitted by the access point, which may include packet types that can be transmitted in the RAW, packet sizes may be restricted, station ordering may need to be followed, and the like.

Figure 7:
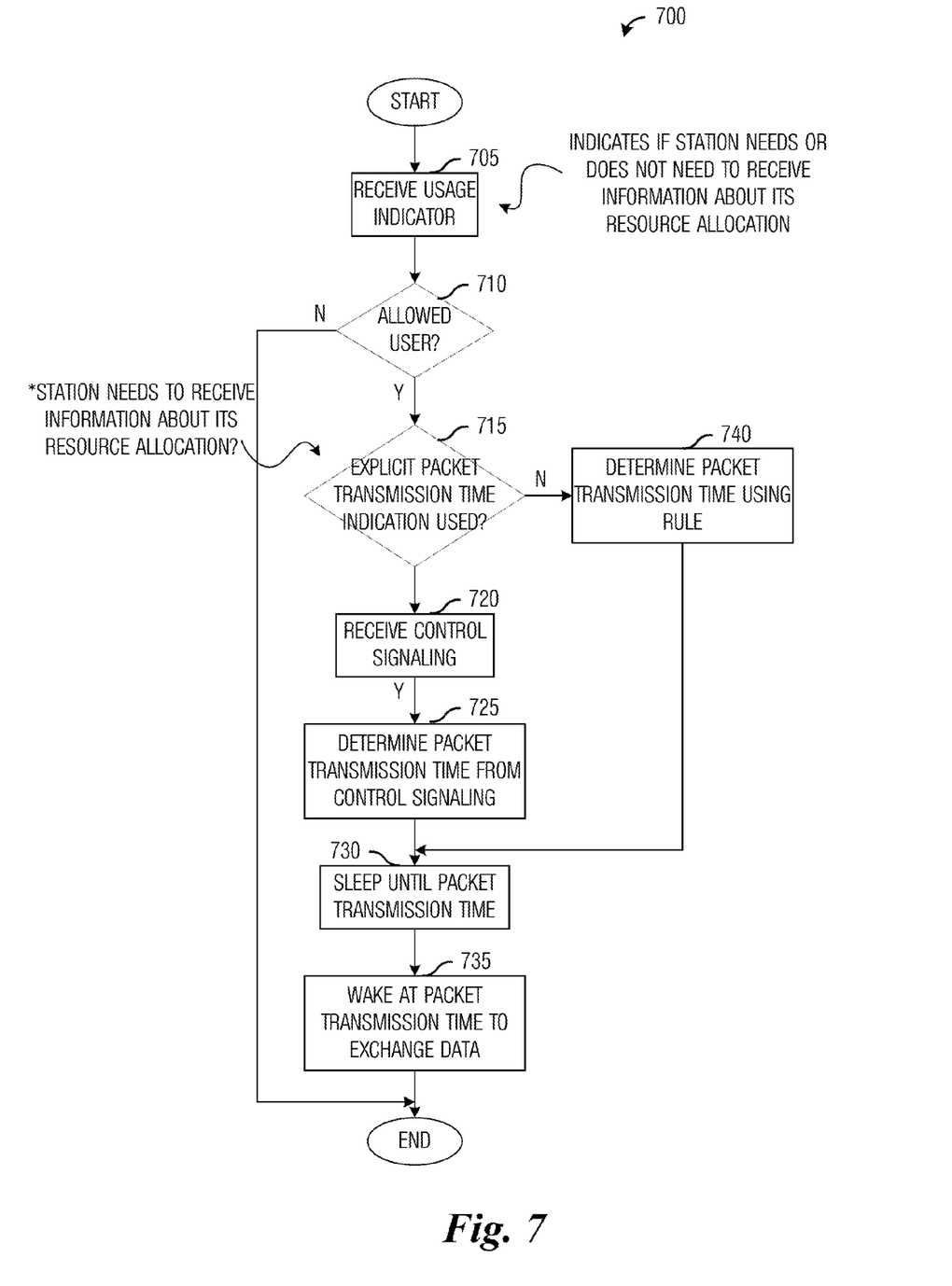
FIG. 7 illustrates an example flow diagram of operations occurring in a station as the station exchanges data with an access point according to example embodiments described herein.

FIG. 7 illustrates a flow diagram of operations 700 occurring in a station as the station exchanges data with an access point. Operations 700 may be indicative of operations occurring in a station, such as stations 110-134, as the station exchanges data with an access point.

Operations 700 may begin with the station receiving a usage indicator from an access point (block 705). As discussed previously, the usage indicator may include information such as a technique used to indicate packet transmission time, a start time of a RAW, a duration of the RAW, stations allowed to access the communications channel during the RAW, packet types to be transmitted during the RAW, slot duration, and the like. The usage indicator may indicate if the station needs to receive information about its resource allocation (explicit transmission time indication is used) or if the station does not need to receive information about its resource allocation (implicit transmission time indication is used). The usage indicator may be broadcast by the access point in a beacon, for example. It is noted that prior to receiving the usage indicator, the station may transmit a polling packet, e.g., a PS-Poll, to the access point in response to receiving a TIM where the station is indicated as having downlink information buffered at the access point.

The station may perform a check to determine if it has been allowed to access the communications channel during the RAW (block 710). As an example, the station may check in the usage indicator to determine if it has been allowed to access the communications channel during the RAW. The usage indicator may list specific stations, types of stations, groups of stations, and the like, that are allowed to access the communications channel during the RAW. If the station has not been allowed to access the communications channel during the RAW, operations 700 may terminate.

If the station has been allowed to access the communications channel, the station may perform a check to determine if explicit indication of packet transmission time is being used in the RAW (block 715). The station may check in the usage indicator to determine if explicit indication of packet transmission time is being used. In other words, the station may check to determine if it needs to receive information about its resource allocations The usage indicator may include a single bit value or a multi-bit indicator that indicates if explicit indication of packet transmission time or implicit indication of packet transmission time is being used. If explicit indication of packet transmission time is being used, the station may receive control signaling from the access point (block 720). The control signaling may be broadcast by the access point prior to the start of packet transmission times in the RAW or prior to the RAW completely, in a broadcast packet, for example. The control signaling may specify packet transmission times for at least a subset of the stations that have been allowed to access the communications channel. As an example, the control signaling may specify packet transmission times for stations that responded during a polling interval. The control signaling may also include an adjustment to the RAW, such as the duration of the RAW. The station may determine its packet transmission time from the control signaling (block 725). As an illustrative example, the control signaling may sequentially list the packet transmission times and the station may select its packet transmission time in accordance with its position in a list of stations having been allowed access to the communications channel.

The station may enter a sleep or reduced power state in order to conserve energy until its packet transmission time (block 730). However, if the station has other tasks to perform, it may not necessarily enter the sleep or reduced power state. The station may wake from the sleep or reduced power state at its packet transmission time to perform the data exchange with the access point (block 735). It is noted that if the station did not enter the sleep or reduced power state, the station may continue performing its tasks until its packet transmission time. At that time, the station may direct its attention to performing the data exchange with the access point.

If explicit indication of packet transmission time is not used (i.e., implicit indication of packet transmission time is used), the station may determine its packet transmission time using a pre-specified rule (block 740). As an illustrative example, the station may be able to determine its packet transmission time in accordance with its position in a list of stations having been allowed access to the communications channel. The station may move to block 730 where it may enter a sleep or reduced power state in order to conserve energy until its packet transmission time.

Figure 8:
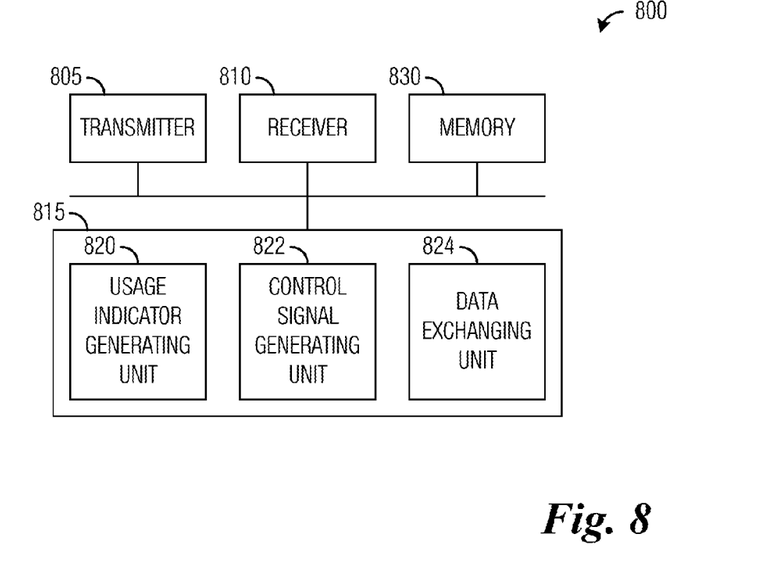
FIG. 8 illustrates an example first communications device according to example embodiments described herein.

FIG. 8 illustrates a first communications device 800. Communications device 800 may be an implementation of a communications controller, such as a base station, an access point, a NodeB, an eNB, a base terminal station, and the like. Communications device 800 may be used to implement various ones of the embodiments discussed herein. As shown in FIG. 8, a transmitter 805 is configured to transmit Beacon frames, Short Beacon frames, usage indicators, broadcast packets, control signals, and the like. Communications device 800 also includes a receiver 810 that is configured to receive packets, usage indicators, broadcast packets, and the like.

A usage indicator generating unit 820 is configured to generate usage indicators for RAWs. Usage indicator generating unit 820 is configured to include information such as a start time of a RAW, a duration of the RAW, stations allowed to access the communications channel during the RAW, packet types to be transmitted during the RAW, a technique used to indicate packet transmission time, slot duration, and the like. A control signal generating unit 822 is configured to generate control signals to specify packet transmission times for stations served by communications device 800. The control signals may also include an adjustment to the RAW. A data exchanging unit 824 is configured to exchange data with stations. Data exchanging unit 824 may generate packets to transmit to the stations and/or process packets received from the stations. A memory 830 is configured to store Beacon frames, Short Beacon frames, usage indicators, control signals, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while usage indicator generating unit 820, control signal generating unit 822, and data exchanging unit 824 may be software modules executing in a microprocessor (such as processor 815) or a custom circuit or a custom compiled logic array of a field programmable logic array. Usage indicator generating unit 820, control signal generating unit 822, and data exchanging unit 824 may be modules stored in memory 830.

Figure 9:
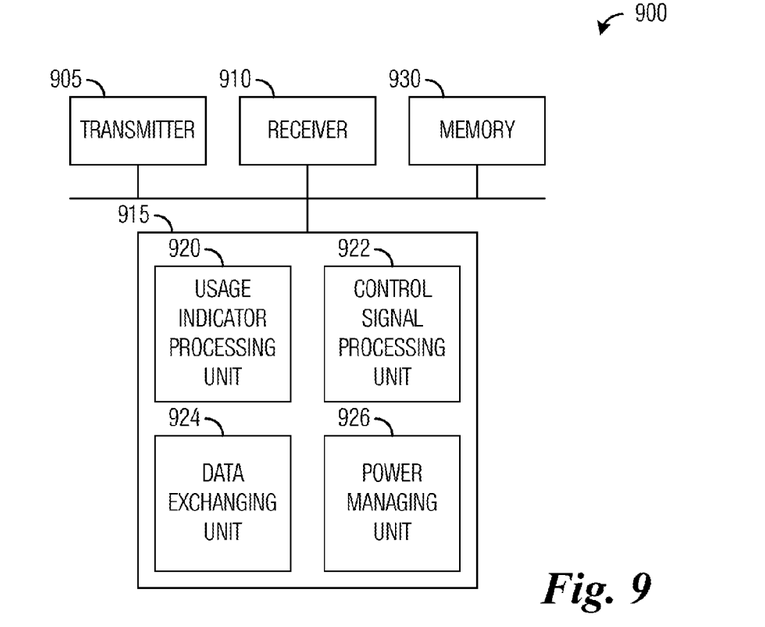
FIG. 9 illustrates an example second communications device according to example embodiments described herein.

FIG. 9 illustrates a second communications device 900. Communications device 900 may be an implementation of a communications device, such as a station, a user, a NodeB, an enhanced NodeB, a subscriber, a terminal, and the like. Communications device 900 may be used to implement various ones of the embodiments discussed herein. As shown in FIG. 9, a transmitter 905 is configured to transmit packets, and the like. Communications device 900 also includes a receiver 910 that is configured to receive packets, usage indicators, broadcast packets, control signals, and the like.

A usage indicator processing unit 920 is configured to process received usage indicators to determine characteristics of a RAW. Usage indicator processing unit 920 is configured to determine if communications device 900 is allowed to access the communications channel during the RAW, an indication technique used to indicate packet transmission times, and the like. A control signal processing unit 922 is configured to process received control signals. Control signal processing unit 922 is configured to determine a packet transmission time for communications device 900, as well as an adjustment to the RAW. A data exchanging unit 924 is configured to exchange data with access points. Data exchanging unit 924 may generate packets to transmit to the access point and/or process packets received from the access point. A power managing unit 926 is configured to set an operating mode, such as sleep mode, reduced power mode, full power mode, and the like, of communications device 900. A memory 930 is configured to store usage indicators, control signals, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while usage indicator generating unit 920, control signal generating unit 922, data exchanging unit 924, and power managing unit 926 may be software modules executing in a microprocessor (such as processor 915) or a custom circuit or a custom compiled logic array of a field programmable logic array. Usage indicator generating unit 920, control signal generating unit 922, data exchanging unit 924, and power managing unit 926 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for exchanging data, the method comprising:
generating, by an access point, a usage indicator for an access window, the usage indicator including a first indication of if an allowed station in a list of allowed stations needs to receive information about its resource allocation and at least one of a second indication of a start time of the access window, and a third indication of the list of allowed stations;
broadcasting, by the access point, the usage indicator; and
exchanging, by the access point, data with at least one of the allowed stations within the access window in accordance with the usage indicator.

2. The method of claim 1, wherein the usage indicator is broadcasted in a first management packet.

3. The method of claim 1, wherein the first indication indicates that the allowed station in the list of allowed stations does not need to receive information about its resource allocation.

4. The method of claim 1, wherein the first indication indicates that the allowed station in the list of allowed stations does need to receive information about its resource allocation, and wherein the method further comprises:
generating control signals for data exchanges between a subset of the list of allowed stations and the access point; and
broadcasting the control signals.

5. The method of claim 4, wherein the control signals are broadcasted in a second management packet.

6. The method of claim 5, wherein the second management packet is transmitted at a start of the access window.

7. The method of claim 4, wherein the control signals comprise a starting time for a data exchange between each allowed station in the subset of the list of allowed stations and the access point.

8. The method of claim 4, wherein the control signals comprise an adjustment to a duration of the access window.

9. The method of claim 4, further comprising receiving polling packets from the subset of the list of the allowed stations, and wherein the control signals are generated in accordance with the polling packets received.

10. A method for exchanging data, the method comprising:
receiving, by a station, a usage indicator for an access window, the usage indicator including a first indication of if allowed stations need to receive information about their resource allocation and at least one of a second indication of a starting time of the access window, and a third indication of a list of allowed stations;
determining, by the station, if the station is in the list of allowed stations; and
exchanging, by the station, data with an access point within the access window in accordance with the usage indicator if the station is in the list of allowed stations.

11. The method of claim 10, wherein the usage indicator is received in a first management packet.

12. The method of claim 10, wherein the station is in the list of allowed stations, wherein the first indication indicates that the allowed stations do need to receive information about their resource allocations, wherein the method further comprises receiving control signals for a data exchange between the station and the access point, and wherein exchanging the data with the access point within the access window comprises:
determining a first data exchange time in accordance with the control signals; and
exchanging the data with the access point at the first data exchange time.

13. The method of claim 12, wherein the control signals are received in a second management packet.

14. The method of claim 12, wherein the control signals comprise a starting time for the data exchange between the station and the access point.

15. The method of claim 12, further comprising prior to receiving the control signals, waking up from a reduced power state.

16. The method of claim 10, wherein the station is in the list of allowed stations, wherein the first indication indicates that the allowed stations do not need to receive information about their resource allocations, and wherein exchanging the data with the access point within the access window comprises:
determining a second data exchange time in accordance with a specified rule; and
exchanging the data with the access point at the second data exchange time.

17. The method of claim 10, further comprising transmitting a polling packet to the access point.

18. An access point comprising:
a processor configured to generate a usage indicator for an access window, the usage indicator including a first indication of if an allowed station in a list of allowed stations needs to receive information about its resource allocation and at least one of a second indication of a start time of the access window, and a third indication of the list of allowed stations, and to exchange data with at least one of the allowed stations within the access window in accordance with the usage indicator; and
a transmitter operatively coupled to the processor, the transmitter configured to broadcast the usage indicator.

19. The access point of claim 18, wherein the transmitter is configured to transmit the usage indicator in a first management frame.

20. The access point of claim 18, wherein the first indication indicates that the allowed station in the list of allowed stations does need to receive information about its resource allocation, wherein the processor is configured to generate control signals for data exchanges between a subset of the list of allowed stations and the access point, and wherein the transmitter is configured to broadcast the control signals.

21. The access point of claim 20, wherein the transmitter is configured to transmit the control signals in a second management packet.

22. The access point of claim 21, wherein the transmitter is configured to transmit the second management packet at a start of the access window.

23. A station comprising:
a receiver configured to receive a usage indicator for an access window, the usage indicator including a first indication of if an allowed station needs to receive information about its resource allocation and at least one of a second indication of a starting time of the access window, and a third indication of a list of allowed stations; and
a processor operatively coupled to the receiver, the processor configured to determine if the station is in the list of allowed stations, and to exchange data with an access point within the access window in accordance with the usage indicator if the station is in the list of allowed stations.

24. The station of claim 23, wherein the receiver is configured to receive the usage indicator in a first management frame.

25. The station of claim 23, wherein the station is in the list of allowed stations, wherein the first indication indicates that the allowed stations do need to receive information about its resource allocation, wherein the receiver is configured to receive control signals for a data exchange between the station and the access point.

26. The station of claim 25, wherein the processor is configured to determine a first data exchange time in accordance with the control signals, and to exchange the data with the access point at the first data exchange time.

27. The station of claim 23, wherein the station is in the list of allowed stations, wherein the first indication indicates that the allowed stations do not need to receive information about their resource allocations, and wherein the processor is configured to determine a second data exchange time in accordance with a specified rule, and to exchange the data with the access point at the second data exchange time.

28. A method for operating an access point of an IEEE 802.11 compliant communications system, the method comprising:
specifying, by the access point, a restricted access window for a restricted access window (RAW) Group of stations served by the access point;
generating, by the access point, a first indicator of if a station in the RAW Group of stations needs to receive information about its resource allocation; and
broadcasting, by the access point, information about the restricted access window and the first indicator in one of a beacon frame and a short beacon frame.

29. The method of claim 28, wherein the information about the restricted access window and the first indicator are broadcasted in a RAW Parameter Set information element.

30. The method of claim 29, wherein the RAW Parameter Set information element comprises the RAW Group, a RAW Start Time, a RAW Duration, and the first indicator.

31. The method of claim 28, wherein the first indicator indicates the station does not need to receive information about its resource allocation.

32. The method of claim 28, wherein the first indicator indicates the station does need to receive information about its resource allocation, and wherein the method further comprises:
- allocating resources within the restricted access window to at least one station in the RAW Group of stations served by the access point;
- generating control signals corresponding to allocated resources; and
- broadcasting the control signals.

33. The method of claim 32, wherein the control signals are broadcasted at a beginning of the restricted access window.

* * * * *